United States Patent
Hinton et al.

(10) Patent No.: US 11,542,449 B2
(45) Date of Patent: Jan. 3, 2023

(54) MARKER COMPOSITIONS WITH NITROGEN COMPOUNDS, AND METHODS FOR MAKING AND USING SAME

(71) Applicant: United Color Manufacturing, Inc., Newtown, PA (US)

(72) Inventors: Michael P. Hinton, Richboro, PA (US); Justin J. Frederico, Yardley, PA (US)

(73) Assignee: UNITED COLOR MANUFACTURING, INC., Newton, PA (US)

( * ) Notice: Subject to any disclaimer, the term of this patent is extended or adjusted under 35 U.S.C. 154(b) by 575 days.

(21) Appl. No.: 16/110,470

(22) Filed: Aug. 23, 2018

(65) Prior Publication Data
US 2019/0085253 A1    Mar. 21, 2019

Related U.S. Application Data

(60) Provisional application No. 62/549,087, filed on Aug. 23, 2017.

(51) Int. Cl.
*C10L 1/00*     (2006.01)
*G01N 30/68*    (2006.01)
(Continued)

(52) U.S. Cl.
CPC .......... *C10L 1/003* (2013.01); *G01N 21/3151* (2013.01); *G01N 21/3504* (2013.01);
(Continued)

(58) Field of Classification Search
CPC    C10L 1/003; G01N 21/3151; G01N 21/3504; G01N 21/65; G01N 21/30; G01N 21/68; G01N 30/70
See application file for complete search history.

(56) References Cited

U.S. PATENT DOCUMENTS 4,555,489 A * 11/1985 Schmitt .................. E21B 47/11
                                                              436/27
5,229,298 A     7/1993 Zoumalan
(Continued)

FOREIGN PATENT DOCUMENTS

KR    20020033033 A    5/2002
WO    2012125120 A1    9/2012
(Continued)

OTHER PUBLICATIONS

PCT International Search Report and Written Opinion, PCT/US2018/047713, dated Nov. 27, 2018, 17 pages.
(Continued)

*Primary Examiner* — Brian J. Sines
(74) *Attorney, Agent, or Firm* — Quarles & Brady, LLP

(57) ABSTRACT

The present disclosure provides compositions, methods, and systems for identifying marked hydrocarbon fluids. These compositions, methods, and systems utilize a gas chromatography marker including a non-pyrrolidinone nitrogen-containing compound. The methods and systems can identify the presence or absence of the gas chromatography marker and/or the non-pyrrolidinone nitrogen-containing compound. The compositions, methods, and systems can optionally utilize a spectroscopic marker.

18 Claims, 1 Drawing Sheet

(51) Int. Cl.
    *G01N 30/70*     (2006.01)
    *G01N 21/31*     (2006.01)
    *G01N 21/3504*     (2014.01)
    *G01N 21/65*     (2006.01)
    *C09B 11/08*     (2006.01)
    *G01N 30/02*     (2006.01)
    *G01N 30/88*     (2006.01)

(52) U.S. Cl.
    CPC ............. *G01N 21/65* (2013.01); *G01N 30/68* (2013.01); *G01N 30/70* (2013.01); *C09B 11/08* (2013.01); *C10L 2230/16* (2013.01); *G01N 2021/3155* (2013.01); *G01N 2030/025* (2013.01); *G01N 2030/8854* (2013.01)

(56) References Cited

U.S. PATENT DOCUMENTS

| | | |
|---|---|---|
| 5,498,808 A | 3/1996 | Smith |
| 5,672,182 A | 9/1997 | Smith |
| 5,676,708 A | 10/1997 | Smith |
| 5,858,930 A | 1/1999 | Desai et al. |
| 6,002,056 A | 12/1999 | Smith et al. |
| 6,482,651 B1 | 11/2002 | Smith et al. |
| 7,157,563 B2 | 1/2007 | Smith |
| 7,163,827 B2 | 1/2007 | Smith et al. |
| 7,825,159 B2 | 11/2010 | Frederico et al. |
| 2006/0228802 A1* | 10/2006 | Tiller .................. G01N 27/333 436/56 |
| 2007/0184555 A1 | 8/2007 | Banavali et al. |
| 2012/0090225 A1* | 4/2012 | Green .................... C10L 1/003 44/440 |
| 2018/0059089 A1* | 3/2018 | Hinton ................ C10M 133/44 |

FOREIGN PATENT DOCUMENTS

| | | |
|---|---|---|
| WO | 2014087360 A1 | 6/2014 |
| WO | 2014179646 A1 | 11/2014 |
| WO | 2018039405 A1 | 3/2018 |

OTHER PUBLICATIONS

European Patent Office. Extended European Search Report for application 18848524.7, dated Apr. 23, 2021. 8 pages.

\* cited by examiner

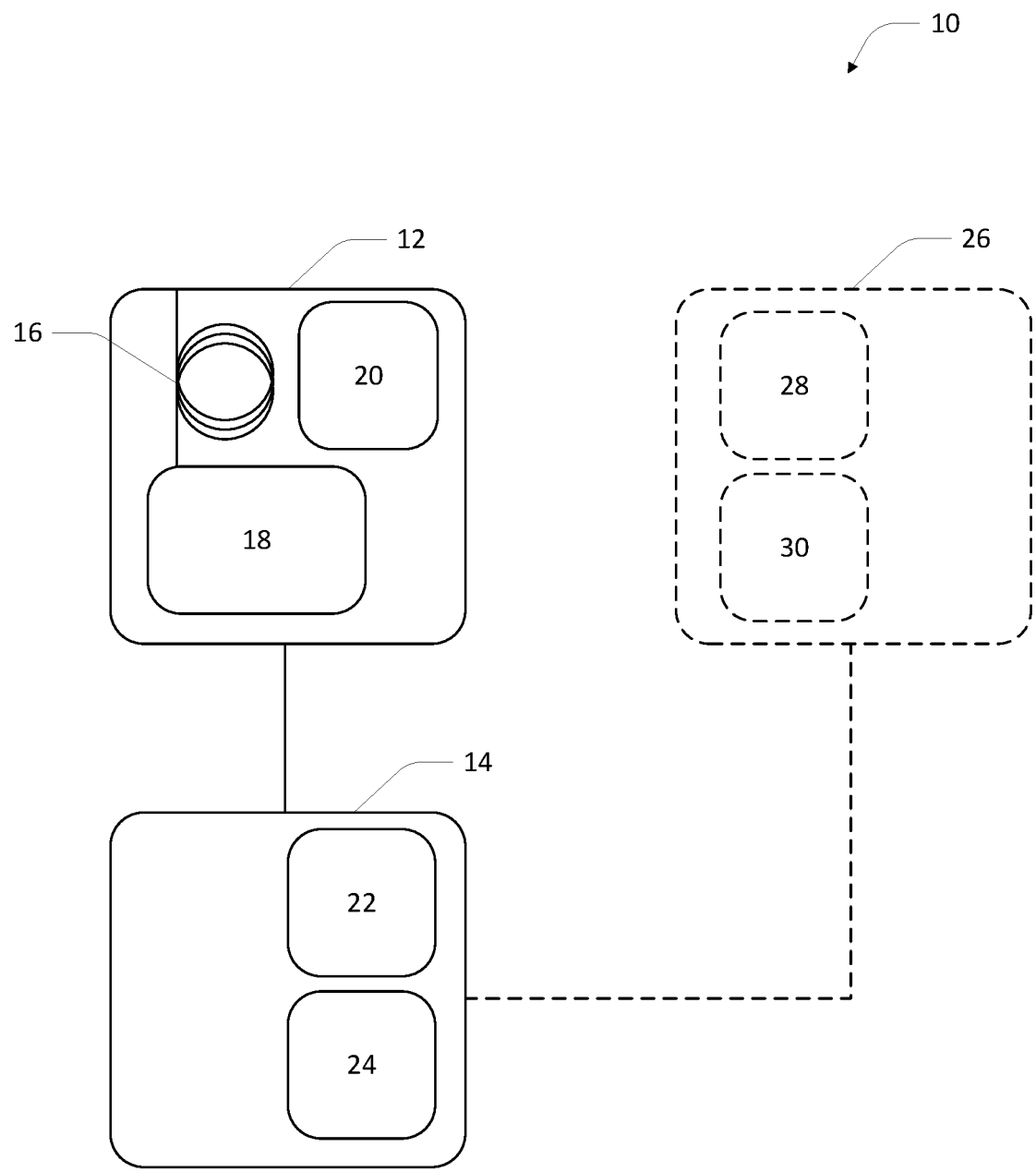

MARKER COMPOSITIONS WITH NITROGEN COMPOUNDS, AND METHODS FOR MAKING AND USING SAME

CROSS-REFERENCE TO RELATED APPLICATIONS

This application is related to, claims priority to, and incorporates herein by reference for all purposes U.S. Provisional Patent Application No. 62/549,087, filed Aug. 23, 2017.

STATEMENT REGARDING FEDERALLY SPONSORED RESEARCH n/a

BACKGROUND OF THE INVENTION

The field of the invention is marker compositions for fluids. More particularly, the invention relates to marker compositions with nitrogen-containing compounds.

A marker is a substance which can be used to tag products, typically petroleum products, as well as alcohols and a number of other suitable fluids, for subsequent detection. The marker is normally dissolved in a fluid to be identified, then subsequently detected by performing a physical or chemical test on the tagged fluid. For example, markers are sometimes used by government authorities to ensure that the appropriate tax has been paid on particular grades of fuel. Oil companies also mark their products to help identify those who have diluted or altered their products. These companies often go to great expense to make sure their branded petroleum products meet certain specifications regarding volatility and octane number, for example, as well as to provide their petroleum products with effective additive packages containing detergents and other components. Consumers rely upon the product names and quality designations to assure that the product being purchased is the quality desired.

It is possible for unscrupulous persons to increase profits by selling an inferior product at the price consumers are willing to pay for a high quality branded or designated product. Higher profits can also be made simply by diluting the branded product with an inferior product. Policing retailers/dealers, for example, who substitute one product for another or blend branded products with inferior products is difficult in the case of gasoline because the blended products will qualitatively display the presence of each component in the branded products. The key ingredients of the branded products are generally present in such low levels that quantitative analysis to detect dilution with an inferior product is very difficult, time consuming and expensive.

Marker systems for petroleum products, including, but not limited to, fuels, lubes, greases, etc., have been suggested but various drawbacks have existed which have hindered their effectiveness. Many currently available markers cannot be used as both forensic markers, detected by, but not limited to analysis by Gas Chromatography (GC), and simple field test markers detected by, but not limited to, development or extraction of the marker. Many known markers are easily removed from the fluid to which they are added destroying the integrity of the marker system. Many currently available markers cannot be easily combined to detect marker product with a component that cannot be laundered from the fuel. And current methods of lab analysis of these markers ends to be very expensive.

In view of the above, it would be desirable to provide a composition useful as a marker and that could be detected not only in the field, but also in the lab. It would be desirable to combine field test technology with existing chromatography techniques to provide not only field test results but also a laboratory confirmation of the marker presence, using common lab techniques, such as, but not limited to, analysis by GC. Additionally, the marker should be able to accomplish the above and remain resistant to undesired extraction or removal (laundering) by unscrupulous persons. Additionally it would be desirable to provide a marker composition that could be used in a wide variety of fluids, including, but not limited to, petroleum products, alcohols, etc. Petroleum products may include, but are not limited to, fuels, lubes, greases, etc. It would also be desirable to provide economical detection methods not requiring advanced training of the operator.

SUMMARY OF THE INVENTION

In an aspect, the present disclosure provides a method of identifying marked hydrocarbon fluids that have been laundered, wherein unlaundered marked hydrocarbon fluids contain a gas chromatography marker and a spectroscopic marker. The gas chromatography marker includes a non-pyrrolidinone nitrogen-containing compound. The method includes: a) introducing a first portion of a hydrocarbon fluid sample that is suspecting of having been laundered into a gas chromatography system, thereby resulting in a gas chromatography report of the hydrocarbon fluid sample; b) spectroscopically analyzing a second portion of the hydrocarbon fluid sample, thereby resulting in a spectroscopic report of the hydrocarbon fluid sample; c) identifying the presence or absence of the gas chromatography marker using the gas chromatography report and identifying the presence or absence of the spectroscopic marker using the spectroscopic report; and d) based on the identifying of step c): if the gas chromatography marker and the spectroscopic marker are identified as present, then indicating that the hydrocarbon fluid sample is marked and unlaundered; if the gas chromatography marker is identified as present and the spectroscopic marker is identified as absent, then indicating that the hydrocarbon fluid sample is marked and laundered; and if the gas chromatography marker and the spectroscopic marker are identified as absent, then indicating the hydrocarbon fluid is unmarked.

In another aspect, the present disclosure provides a method of marking a subset of hydrocarbon fluids in circulation within a market and detecting presence of the marking. The method includes: a) adding a gas chromatography marker comprising a non-pyrrolidinone nitrogen-containing compound to the subset of the hydrocarbon fluids in circulation within the market; b) selecting a sample of one of the hydrocarbon fluids in circulation within the market; c) introducing at least a portion of the sample of one of the hydrocarbon fluids in circulation within the market into a gas chromatography system, thereby resulting in a gas chromatography report of the sample; and d) identifying the presence or absence of the non-pyrrolidinone nitrogen-containing compound in the sample using the gas chromatography report, thereby identifying whether the sample is from within or without the subset of hydrocarbon fluids.

In a further aspect, the present disclosure provides a method of identifying a hydrocarbon fluid containing a gas chromatography marker including a non-pyrrolidinone nitrogen-containing compound. The method includes: a) introducing a sample of the hydrocarbon fluid into a gas chromatography system, thereby resulting in a gas chromatography report of the sample; and b) identifying the presence of the non-pyrrolidinone nitrogen-containing compound in the hydrocarbon fluid using the gas chromatography report.

In yet another aspect, the present disclosure provides a marker composition. The marker composition includes: a gas chromatography marker including a non-pyrrolidinone nitrogen-containing compound; and a solvent.

In yet a further aspect, the present disclosure provide a marker composition. The marker composition includes: a gas chromatography marker including a non-pyrrolidinone nitrogen-containing compound; and a spectroscopic marker.

In an additional aspect, the present disclosure provides a marked hydrocarbon fluid. The marked hydrocarbon fluid includes a hydrocarbon fluid and the marker compositions as described herein. The marker composition is present in an amount sufficient to provide a concentration of the non-pyrrolidinone nitrogen-containing compound in the marker hydrocarbon fluid of between 0.1 ppm and 500 ppm, to provide a concentration of the spectroscopic marker in the marker hydrocarbon fluid of between 0.1 ppm and 500 ppm, or a combination thereof.

In yet another aspect, the present disclosure provides a kit. The kit includes the marker composition as described herein and a reference gas chromatography report for the non-pyrrolidinone nitrogen-containing compound of the marker composition.

In yet a further aspect, the present disclosure provides a system for identifying hydrocarbon fluids marked with a gas chromatography marker including a non-pyrrolidinone nitrogen-containing compound. The system includes a gas chromatography with nitrogen phosphorus detector (GC-NPD) system; and a computer. The computer has a processor and a memory. The memory has stored thereon a reference gas chromatography report for the non-pyrrolidinone nitrogen-containing compound and instructions that, when executed by the processor, cause the processor to receive a gas chromatography report from the GC-NPD system and identify the present or absence of the gas chromatography marker based on a comparison with the reference gas chromatography report.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

In order to assist the understanding of this invention, reference will now be made to the appended drawings, in which like reference characters refer to like elements. The drawings are exemplary only, and should not be construed as limiting the invention.

FIG. 1 is a system, in accordance with various aspects of the present disclosure.

DETAILED DESCRIPTION OF THE INVENTION

Before the present materials and methods are described, it is understood that this disclosure is not limited to the particular methodology, protocols, materials, and reagents described, as these may vary. It is also to be understood that the terminology used herein is for the purpose of describing particular embodiments only, and is not intended to limit the scope of the present invention which will be limited only by the appended claims.

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Unless defined otherwise, all technical and scientific terms and abbreviations used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein, including, but not limited to, U.S. Pat. Nos. 5,498,808, 5,676,708, 5,672,182, 5,858,930, 6,002,056, 6,482,651, 7,157,563, 7,163,827 and 7,825,159 are incorporated by reference for all purposes including describing and disclosing the chemicals, instruments, statistical analysis and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

As used herein, an "alkyl group" refers to an alkane lacking a single hydrogen and includes straight chain, branched, and cyclic alkyl groups. For clarity, as used herein, an alkyl group with three carbon atoms includes isopropyl groups, unless the context clearly dictates otherwise, and the same is true for other alkyl groups. Similarly, an alkyl group with six carbon atoms includes cyclohexyl groups, unless the context clearly dictates otherwise. When defining the number of carbon atoms in an alkyl group, all branches are considered. So, an isopropyl group is an alkyl group having three carbon atoms.

As used herein, an "alkenyl group" refers to an alkene lacking a single hydrogen and includes straight chain, branched, and cyclic alkenyl groups.

As used herein, a "blue due" refers to a dye having a visible electromagnetic radiation absorption maximum of between 580 nm and 660 nm As used herein, "comprising" is an inclusive term and includes recited components or method steps and other non-recited components or method steps.

As used herein, "consisting essentially of" shall have the definition used in patent prosecution before the United States Patent and Trademark Office as of the filing date of this application. A description or claim described as consisting essentially of certain components or method steps shall be limited in scope to the recited components or method steps and those that do not materially affect the basic and novel characteristic(s) of the described or claimed invention.

As used herein, "consisting of" is an exclusive term and includes only recited components or method steps, excluding other non-recited components or method steps.

As used herein, a "cycloalkyl group" refers to a cycloalkane lacking a single hydrogen and includes unsubstituted cycloalkyl groups and cycloalkyl groups having one or more alkyl group substitutions. Multiple rings can be present in a single cycloalkyl group, including fused rings.

As used herein, a "gas chromatography marker" refers to a chemical entity that can be detected by a gas chromatographic means, including but not limited to, gas-chromatography with nitrogen phosphorus detector, gas chromatography-mass spectrometry, and other similar gas chromatographic methods known to those having ordinary skill in the art.

As used herein, a "gas chromatography with nitrogen phosphorus detector marker" refers to a chemical entity that can be detected by gas chromatography with nitrogen phosphorus detector.

As used herein, an "imidazole" refers to a compound including an imidazole group.

As used herein, an "imidazolidone" refers to a compound including an imidazolidone group.

As used herein, a "non-cyclic alkyl group" refers to an alkyl group that includes no cyclic rings.

As used herein, a "nonaqueous" composition refers to a composition where water is present in an amount of less than 1% by weight.

As used herein, a "non-pyrrolidinone" refers to a compound excluding a pyrrolidinone group (also sometimes referred to as a pyrrolidone group).

As used herein, an "oxazole" refers to a compound including an oxazole group.

As used herein, an "oxazoline" refers to a compound including an oxazoline group.

As used herein, an "oxazolidine" refers to a compound including an oxazolidine group.

As used herein, a "phthalein" refers to a compound formed by a reaction of phthalic anhydride with a phenol.

As used herein, a "piperazine" refers to a compound including a piperazine group.

As used herein, a "piperidine" refers to a compound including a piperidine group.

As used herein, a "piperidone" refers to a compound including a piperidone group (also sometimes referred to as a piperidinone group).

As used herein, a "pyrazine" refers to a compound including a pyrazine group.

As used herein, a "pyrazole" refers to a compound including a pyrazole group (also sometimes referred to as a diazole group).

As used herein, a "pyrazolone" refers to a compound including a pyrazolone group.

As used herein, a "pyridazine" refers to a compound including a pyridazine group.

As used herein, a "pyridazinone" refers to a compound including a pyridazinone group.

As used herein, a "pyridine" refers to a compound including a pyridine group (also sometimes referred to as an azine group or an azabenzene group).

As used herein, a "pyrimidine" refers to a compound including a pyrimidine group.

As used herein, a "pyrrole" refers to a compound including a pyrrole group.

As used herein, a "pyrrolidine" refers to a compound including a pyrrolidine group (also sometimes referred to as a tetrahydropyrrole group).

As used herein, a "pyrrolidinone" refers to a compound including a pyrrolidinone group (also sometimes referred to as a pyrrolidone group).

As used herein, a "pyrroline" refers to a compound including a pyrroline group (also sometimes referred to as a dihydropyrrole group).

As used herein, the term "red dye" refers to a dye having a visible electromagnetic radiation absorption maximum of between 500 nm and 580 nm.

As used herein, a "spectroscopic marker" refers to a chemical entity that can be detected by spectroscopic means, including but not limited to, fluorescence spectroscopy, absorbance spectroscopy, Raman spectroscopy, near-infrared spectroscopy, and other spectroscopic methods known to those having ordinary skill in the spectroscopic arts. It should be appreciated that while a spectroscopic marker refers to a chemical entity that can be detected by spectroscopic means, the present disclosure is not limited to actually detecting the spectroscopic marker by such means. For example, a spectroscopic marker can be detected by chromatographic means in ways understood to those having ordinary skill in the analytical chemistry arts.

As used herein, the term "yellow dye" refers to a dye having a visible electromagnetic radiation absorption maximum of between 400 nm and 500 nm.

ABBREVIATIONS

AFID—Alkali Flame Ionization Detector
ECD—Electron Capture Detector
FID—Flame Ionization Detector
GC—Gas Chromatography
GC-MS—Gas Chromatography-Mass Spectrometry
GC-NPD—Gas Chromatography with Nitrogen Phosphorus Detector
GLP—Gel Liquid Permeation
HECD—Hall Electrolytic Conductivity Detector
LC—Liquid Chromatography
LC-MS—Liquid Chromatography-Mass Spectrometry
MS—Mass Spectrometry
NIR—Near Infrared
PID—Photoionization Detector
UV-Vis—Ultraviolet-Visible This disclosure is directed to marker compositions that substantially solve the problem of the launderability, or removal, of spectroscopic markers from organic solvents, including but not limited to, petroleum products, lubricants, or any other hydrocarbon fluids, by introducing a multilayered marker composition reducing one's ability to substantially remove, or launder, the composition from the marked fluid easily or in an economical manner. The novel and nonobvious multilayered marker compositions disclosed herein combine the ability to not only conduct simple field tests to determine the presence of the composition in the marked fluid, but also enable more sophisticated laboratory analysis to detect the composition in the marked fluid.

The present disclosure provides a marker composition for marking a hydrocarbon fluid. The marker composition can take a variety of forms, which can be combined as understood by those having ordinary skill in the art.

In some cases, the marker composition can include a gas chromatography (GC) marker. In some cases, the marker composition can consist essentially of the GC marker. In some cases, the marker composition can consist of the GC marker.

In some cases, the marker composition can include the GC marker and a solvent. In some cases, the marker composition can consist essentially of the GC marker and the solvent. In some cases, the marker composition can consist of the GC marker and the solvent. In each of these compositions, the GC marker can be present in an amount by weight of between 1% and 99%, between 25% and 75%, or between 40% and 60%. In each of these compositions, the solvent can be present in an amount by weight of between 1% and 99%, between 25% and 75%, or between 40% and 60%.

In some cases, the marker composition can include the GC marker and a spectroscopic marker. In some cases, the marker composition can consist essentially of the GC marker and the spectroscopic marker. In some cases, the marker composition can consist of the GC marker and the spectroscopic marker. In each of these compositions, the GC marker can be present in an amount by weight of between 1% and 99%, between 25% and 75%, or between 40% and 60%. In each of these compositions, the spectroscopic marker can be present in an amount by weight of between 1% and 99%, between 25% and 75%, or between 40% and 60%.

In some cases, the marker composition can include the GC marker, the spectroscopic marker, and the solvent. In some cases, the marker composition can consist essentially of the GC marker, the spectroscopic marker, and the solvent. In some cases, the marker composition can consist of the GC marker, the spectroscopic marker, and the solvent. In each of these compositions, the GC marker can be present in an amount by weight of between 10% and 85%, between 20% and 70%, or between 25% and 60%. In each of these compositions, the spectroscopic marker can be present in an amount by weight of between 5% and 80%, between 10% and 50%, or between 15% and 25%. In each of these compositions, the solvent can be present in an amount by weight of between 10% and 85%, between 20% and 70%, or between 25% and 60%.

Any of the aforementioned marker compositions can be nonaqueous.

The GC marker in any of the aforementioned marker compositions can be a gas chromatography with nitrogen phosphorus detector (GC-NPD) marker.

The gas chromatography marker in any of the aforementioned marker compositions can include a non-pyrrolidinone nitrogen-containing compound. The gas chromatography marker in any of the aforementioned marker compositions can consist essentially of a non-pyrrolidinone nitrogen-containing compound. The gas chromatography marker in any of the aforementioned marker compositions can consist of a non-pyrrolidinone nitrogen-containing compound.

Without wishing to be bound by any particular theory, non-pyrrolidinone nitrogen-containing markers can have several advantage over other markers, including pyrrolidinones themselves. First, in some cases, the presence of more than one nitrogen atom in a given molecule can enhance the response in certain GC detection systems. Piperidines, piperidones, pyrazoles, and pyrazolones, for example, contain two nitrogen atoms and can be expected to give larger responses in standard nitrogen-phosphorous GC detectors. These larger responses can give both a better resolution of higher concentrations and better sensitivity at the detection level of the compound in the GC. Better sensitivity allows lower detection levels and permits user of lower quantities of the marker. Considering that many uses of markers in this field involve combustion of fuel (and corresponding combustion of the marker), the reduced quantities can be impactful. Many non-pyrrolidinone nitrogen-containing compounds also have different GC retention times, which can allow multiple different "fingerprints" in a resulting GC spectrum. These different "fingerprints" can afford easier detection when used in fuels, lubes, and greases, which can have complicated GC spectra. In addition to the detection advantages, non-pyrrolidinone nitrogen-containing markers can have other advantages, such as improved solubility in hydrocarbon fluids, such as fuels, lubes, and greases.

In some cases, the non-pyrrolidinone nitrogen-containing compound can be any non-pyrrolidinone nitrogen-containing compound that is soluble in a hydrocarbon fluid at levels from 0.01 ppm to 500 ppm.

In certain applications, the non-pyrrolidinone nitrogen-containing compound can be a pyrrole, a pyrazole, a pyrazolone, a pyridine, a pyridazine, a pyrimidine, a pyrroline, a pyrrolidine, a piperidone, a piperidine, a piperazine, a pyrazine, a pyridazinone, an imidazole, an imidazolidone, an oxazole, an oxazoline, an oxazolidine, a tertiary amine, or a combination thereof. The non-pyrrolidinone nitrogen-containing compound can include zero, one, two, or three alkyl or alkenyl side chains of 1 to 12 carbon atoms in length. The non-pyrrolidinone nitrogen-containing compound can include two or more nitrogen atoms per compound. The non-pyrrolidinone nitrogen-containing compound can include three, four, five, six, seven, eight, nine, ten, or more nitrogen atoms per compound.

In some cases, the non-pyrrolidinone nitrogen-containing compound can be a pyrrole. In some cases, the non-pyrrolidinone nitrogen-containing compound can be 1-methylpyrrole, 1-benzylpyrrole, or 1-phenylpyrrole.

In some cases, the non-pyrrolidinone nitrogen-containing compound can be a pyrazole. In some cases, the non-pyrrolidinone nitrogen-containing compound can be 1,3,5-trimethylpyrazole or 1-phenylpyrazole.

In some cases, the non-pyrrolidinone nitrogen-containing compound can be a pyrazolone. In some cases, the non-pyrrolidinone nitrogen-containing compound can be 3-methyl-1-phenyl-pyrazolone.

In some cases, the non-pyrrolidinone nitrogen-containing compound can be a pyridine. In some cases, the non-pyrrolidinone nitrogen-containing compound can be 2-propylpyridine.

In some cases, the non-pyrrolidinone nitrogen-containing compound can be a pyridazine.

In some cases, the non-pyrrolidinone nitrogen-containing compound can be a pyrimidine. In some cases, the non-pyrrolidinone nitrogen-containing compound can be 4-methylpyrimidine.

In some cases, the non-pyrrolidinone nitrogen-containing compound can be a pyrroline.

In some cases, the non-pyrrolidinone nitrogen-containing compound can be a pyrrolidine. In some cases, the non-pyrrolidinone nitrogen-containing compound can be N-butylpyrrolidine.

In some cases, the non-pyrrolidinone nitrogen-containing compound can be a piperidone.

In some cases, the non-pyrrolidinone nitrogen-containing compound can be a piperidine. In some cases, the non-pyrrolidinone nitrogen-containing compound can be 1-methylpiperidine, 1-ethylpiperidine, 1-ethyl-3-methylpiperidine, or 1-propyl-4-piperidine.

In some cases, the non-pyrrolidinone nitrogen-containing compound can be a piperazine.

In some cases, the non-pyrrolidinone nitrogen-containing compound can be a pyrazine.

In some cases, the non-pyrrolidinone nitrogen-containing compound can be a pyridazinone.

In some cases, the non-pyrrolidinone nitrogen-containing compound can be an imidazole. In some cases, the non-pyrrolidinone nitrogen-containing compound can be a 1-butylimidazole or 2-methylimidazole.

In some cases, the non-pyrrolidinone nitrogen-containing compound can be an imidazolidone.

In some cases, the non-pyrrolidinone nitrogen-containing compound can be an oxazole.

In some cases, the non-pyrrolidinone nitrogen-containing compound can be an oxazoline.

In some cases, the non-pyrrolidinone nitrogen-containing compound can be an oxazolidine.

In some cases, the non-pyrrolidinone nitrogen-containing compound can be a tertiary amine. In some cases, the non-pyrrolidinone nitrogen-containing compound can be trioctylamine.

The spectroscopic marker in any of the aforementioned compositions including any spectroscopic markers known to have a reproducible spectroscopic signal that is distinguishable from inherent spectroscopic signals related to the hydrocarbon fluid being marked. For example, the spectroscopic marker can be a dye that has an absorption spectrum that is distinguishable from the hydrocarbon fluid being marked. As another example, the spectroscopic marker can be a fluorescent dye that has a fluorescence spectrum that is distinguishable from the hydrocarbon fluid being marked.

In some cases, the spectroscopic marker can be any spectroscopic marker that is soluble in a hydrocarbon fluid at levels from 0.01 ppm to 500 ppm.

In certain applications, the spectroscopic marker can be a blue dye, a red dye, or a yellow dye. The spectroscopic marker can be Solvent Red 164 or Solvent Yellow 124.

In certain applications, the spectroscopic marker is:

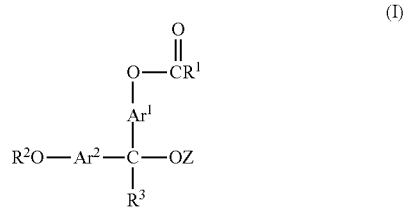

(I)

wherein $Ar^1$ and $Ar^2$ each independently represent a substituted or unsubstituted phenylene group or a substituted or unsubstituted naphthylene group; $R^1$ represents a straight or branched chain alkyl group having 1 to 22 carbon atoms; $R^2$ represents a hydrogen atom or a group of the formula $C(O)R^4$ where $R^4$ is a hydrogen atom or a straight or branched chain alkyl group having 1 to 22 carbon atoms; $R^3$ represents a hydrogen atom, a straight or branched chain alkyl group having 1 to 12 carbon atoms, a straight or branched chain alkoxy group having 1 to 12 carbon atoms, a hydroxyl group, a substituted or unsubstituted phenyl group or a substituted or unsubstituted naphthyl group; and Z represents a hydrogen atom or a group of atoms that combine with Are or $R^3$ to form a lactone ring.

In certain applications, the spectroscopic marker can be a phthalein. The spectroscopic marker can be a phthalein dibutyrate. The spectroscopic marker can be a phthalein ester. The spectroscopic marker can be selected from the group consisting of fluorescein dibutyrate, cresolphthalein, o-cresolphthalein dibutyrate, and thymolphthalein. The spectroscopic marker can be selected from the group consisting of cresolphthalein dibutyrate ester, cresolphthalein monobutyrate ester, cresolphthalein diisopropylate ester, cresolphthalein di-n-propylate ester, cresolphthalein dihexanoate ester, cresolphthalein dipentanoate ester, and cresolphthalein dilaurate ester. The spectroscopic marker can be selected from the group consisting of naphtholphthalein dibutyrate ester, thymolphthalein dibutyrate ester, and thymolphthalein dipropanoate ester. The spectroscopic marker can be selected from the group consisting of sec-butylphenolphthalein dibutyrate ester and di-sec-butylphenolphthalein dibutyrate ester.

It is envisioned that many non-phthalein spectroscopic markers may be used in embodiments of the disclosed compositions. In addition, spectroscopic markers described in U.S. Pat. Nos. 5,498,808, 5,676,708, 5,672,182, 5,858, 930, 6,002,056, 6,482,651, 7,157,563, 7,163,827 and 7,825, 159 are incorporated herein by reference for all purposes.

In some cases, the solvent can be a polar solvent. In some cases, the solvent can be an aprotic solvent. In some cases, the solvent can be selected from the group consisting of petroleum naphtha (boiling points from 100° F. to 250° F.); alcohols, including methanol, ethanol. propanol, butanol, and the like; glycol ethers, including ethylene glycol phenylethyl ether, ethylene glycol dimethyl ether, ethylene glycol diethyl ether, ethylene glycol diphenyl ether, and the like; dimethyl formamide; dimethyl sulfoxide; xylene; toluene; acetone; ethyl acetate; a petroleum product, including gasoline, kerosene, diesel fuel, jet fuel, and the like; and combinations thereof.

The present disclosure also provides marked hydrocarbon fluids. In some cases, the marked hydrocarbon fluids comprise a hydrocarbon fluid and one or more of the marker compositions described elsewhere herein. In some cases, the marked hydrocarbon fluids consist essentially of a hydrocarbon fluid and one or more of the marker compositions described elsewhere herein. In some cases, the marked hydrocarbon fluids consist of a hydrocarbon fluid and one or more of the marker compositions described elsewhere herein.

In each of the marked hydrocarbon fluids, the marker composition can be present in an amount sufficient to provide a concentration of non-pyrrolidinone nitrogen-containing compound in the marked hydrocarbon fluid of between 0.1 ppm and 500 ppm, including but not limited to, a concentration of between 0.5 ppm and 100 ppm, between 1 ppm and 50 ppm, or between 5 ppm and 25 ppm. In some cases, where a spectroscopic marker is present, the marker composition can be present in an amount sufficient to provide a concentration of spectroscopic marker in the marked hydrocarbon fluid of between 0.1 ppm and 500 ppm, including but not limited to, a concentration of between 0.5 ppm and 100 ppm, between 1 ppm and 50 ppm, or between 5 ppm and 25 ppm.

The present disclosure also provides kits. The kits can include any of the marker compositions described herein and information regarding the GC properties and/or the spectroscopic properties of the marker composition. The information can include a reference GC report for the non-pyrrolidinone nitrogen-containing compound. In cases where a spectroscopic marker is present, the information can include a reference spectroscopic report for the spectroscopic marker.

Markers are used in petroleum products such as gasoline, diesel fuel, solvents, lubricants, and other fluids as a means of ensuring product and brand integrity by providing a means to detect adulterated product. Typical adulteration scenarios include the substitution of the premium product with one of lesser quality or the commingling of the premium product with a lesser grade. Other scenarios include the misuse of subsidized or lower taxed fuels.

This disclosure provides a method of identifying a hydrocarbon fluid comprising a gas chromatography marker. The method includes: a) introducing a sample of the hydrocarbon fluid into a gas chromatography system, thereby resulting in a gas chromatography report of the sample; and b) identifying the presence of the non-pyrrolidinone nitrogen-containing compound in the hydrocarbon fluid using the gas chromatography report. In some cases, the hydrocarbon fluid can further comprise a spectroscopic marker. In these cases, the method can further include: c) spectroscopically analyzing a second sample of the hydrocarbon fluid, thereby resulting in a spectroscopic report of the second sample; and d) identifying the presence of the spectroscopic marker in the hydrocarbon fluid using the spectroscopic report.

This disclosure also provides a method of marking a subset of hydrocarbon fluids in circulation within a market and detecting the presence of the marking. The method includes: a) adding a gas chromatography marker comprising a non-pyrrolidinone nitrogen-containing compound to the subset of the hydrocarbon fluids in circulation within the market; b) selecting a sample of one of the hydrocarbon fluids in circulation within the market; c) introducing the sample of one of the hydrocarbon fluids in circulation within the market into a gas chromatography system, thereby resulting in a gas chromatography report of the sample; and d) identifying the presence or absence of the non-pyrrolidinone nitrogen-containing compound in the sample using the gas chromatography report, thereby identifying whether the sample is from within or without the subset of hydrocarbon fluids. The adding of step a) can include adding the GC marker in an amount necessary to provide the non-pyrrolidinone nitrogen-containing compound in the subset of the hydrocarbon fluids in an amount of between 0.1 ppm and 500 ppm, including but not limited to, any other GC marker or non-pyrrolidinone nitrogen-containing compound concentration ranges disclosed herein. This method can include any of the features described above with respect to the method of identifying a hydrocarbon fluid containing a gas chromatography marker. In some cases, the method can further include: e) adding a spectroscopic marker to the subset of the hydrocarbon fluids in circulation within the market; f) spectroscopically analyzing at least a second portion of the sample of one of the hydrocarbon fluids in circulation within the market, thereby resulting in a spectroscopic report of the sample; and g) identifying the presence or absence of the spectroscopic marker in the sample using the spectroscopic report, thereby identifying whether the sample is from within or without the subset of hydrocarbon fluids. The adding of step e) can include adding the spectroscopic marker in an amount necessary to provide the spectroscopic marker in the subset of the hydrocarbon fluids in an amount of between 0.1 ppm and 500 ppm, including but not limited to, any other spectroscopic marker concentration ranges disclosed herein.

This disclosure also provides a method of identifying marked hydrocarbon fluids that have been laundered, wherein unlaundered marked hydrocarbon fluids contain a gas chromatography marker and a spectroscopic marker. The method includes: a) introducing a first portion of a hydrocarbon fluid sample that is suspecting of having been laundered into a gas chromatography system, thereby resulting in a gas chromatography report of the hydrocarbon fluid sample; b) spectroscopically analyzing a second portion of the hydrocarbon fluid sample, thereby resulting in a spectroscopic report of the hydrocarbon fluid sample; c) identifying the presence or absence of the gas chromatography marker using the gas chromatography report and identifying the presence or absence of the spectroscopic marker using the spectroscopic report; and d) based on the identifying of step c): if the gas chromatography marker and the spectroscopic marker are identified as present, then indicate that the hydrocarbon fluid sample is marked and unlaundered; if the gas chromatography marker is identified as present and the spectroscopic marker is identified as absent, then indicate that the hydrocarbon fluid sample is marked and laundered; and if the gas chromatography marker and the spectroscopic marker are identified as absent, then indicate the hydrocarbon fluid is unmarked.

In each of these methods, the introducing of a sample or portion of a fluid into a GC system step can include introducing the sample or portion of a fluid into a GC-NPD system, thereby resulting in a GC-NPD report. The GC-NPD system can include a flame thermionic detector or an alkali flame ionization detector. In these cases, the GC report resulting from the introducing step can include an intensity value that is proportional to an amount of nitrogen or phosphorus in the sample or fluid. This intensity can be time-variable as a function of elution times of the various components of the sample or fluid. In certain cases, having multiple nitrogen atoms in a GC marker can provide enhanced detection as described elsewhere herein.

In each of these methods, in some cases, the introducing of a sample or portion of a fluid into a GC system step can include introducing the sample or portion of a fluid into a GC-MS system, a GC-NPD system, including a GC-NPD system with a flame thermionic detector (FTD) or an alkali-flame ionization detector (AFID), a GC-Hall electrolytic conductivity detector (HECD) system, a GC-flame ionization detector (FID) system, a GC-electron capture detector (ECD) system, a GC-photionization detector (PID) system, or a combination thereof.

The introducing of a sample or portion of a fluid into the GC system step can also include use of a fused silica column, a polyethylene glycol column, a cyano propyl column, a trifluorpropyl column, a substituted polysiloxane column, or the like. The introducing of a sample or portion of a fluid into the GC system step can include use of a carrier gas selected from the group consisting of nitrogen, helium, and combinations thereof. Other operational parameters of the gas chromatography system can be optimized in ways understood to those having ordinary skill in the art for the purpose of improving separation between the GC marker and the various components of the marked hydrocarbon fluid.

In each of these methods, the identifying steps involving a GC report can include monitoring the intensity value at one or more predetermined elution times.

In each of these methods, the spectroscopically analyzing steps can include conducting fluorescence spectroscopy, UV-Vis spectroscopy, Raman spectroscopy, near-infrared spectroscopy, chromatographic techniques, such as liquid chromatography-mass spectrometry (LC/MS), GLP (gel liquid permeation), or a combination thereof.

In each of these methods, the identifying steps involving a spectroscopic report can include comparing the spectroscopic report to a reference spectrum for the spectroscopic marker.

Referring to FIG. 1, the present disclosure provides a system 10. The system can include a GC system 12 and a computer 14. The GC-NPD system 12 can include a GC column 16 and a GC detector 18. The GC system 12 can include a carrier gas source 20.

In some cases, the GC system 12 can be a GC-NPD system. In some cases, the GC system 12 can be a GC-MS system.

The GC column 16 can be a fused silica column, a polyethylene glycol column, a cyano propyl column, a trifluorpropyl column, a substituted polysiloxane column, or other column known those having ordinary skill in the chromatography arts to be suitable for separating the GC markers described herein from the hydrocarbon fluids. In some cases, the GC detector 18 can be a NPD. In some cases, the GC detector 18 can be a MS. In some cases, the GC detector 18 can be a NPD, including a FTD or an AFID, a MS, a HECD, a FID, an ECD, a PID, or a combination thereof. The nitrogen phosphorus detector can be a flame thermionic detector, an alkali flame-ionization detector, or other nitrogen phosphorus detectors known to those having ordinary skill in the chromatography arts. The carrier gas source 20 can be a helium source, a nitrogen source, or a combination thereof.

The computer 14 can include a processor 22 and a memory 24. The computer can also include various displays, inputs, and the like, as understood by those having ordinary skill in the computing arts. The memory can have stored thereon instructions that, when executed by the processor, cause the processor to receive GC reports and/or spectroscopy reports and execute the identify step or steps of any of the methods described herein.

The memory 24 can have stored thereon one or more reference GC reports, corresponding to GC markers or non-pyrrolidinone nitrogen-containing compounds intended to be analyzed by the system 10.

The system 10 can further include a spectroscopy system 26. The spectroscopy system 26 can include a light source 28 and a light detector 30.

The memory 24 can have stored thereon one or more reference spectroscopic reports, corresponding to the spectroscopic markers intended to be analyzed by the system.

The GC system 12 and optional spectroscopy system 26 can have on-board processors and memories, as understood by those having ordinary skill in the art. Communication between the computer and the GC system 12 and optional spectroscopy system 26 can be wired or wireless, using any communication protocol known to those having ordinary skill in the communication arts.

The present invention has been described in terms of one or more preferred embodiments, and it should be appreciated that many equivalents, alternatives, variations, and modifications, aside from those expressly stated, are possible and within the scope of the invention.

The invention claimed is:

1. A method of identifying a hydrocarbon fluid containing a gas chromatography marker comprising a non-pyrrolidinone nitrogen-containing compound and a spectroscopic marker, wherein the non-pyrrolidinone nitrogen-containing compound and the spectroscopic marker are different chemical entities, wherein the non-pyrrolidinone nitrogen-containing compound is a core structure with zero, one, two, or three alkyl or alkenyl side chains of 1 to 12 carbon atoms in length, wherein the core structure is pyrrole, pyrazole, pyrazolone, pyridine, pyridazine, pyrimidine, pyrrole, pyrrolidine, piperidone, piperidine, piperazine, pyrazine, pyridazinone, imidazole, imidazolidone, oxazole, oxazoline, or oxazolidine, the method comprising:
  a) introducing a sample of the hydrocarbon fluid into a gas chromatography system, thereby resulting in a gas chromatography report of the sample;
  b) identifying the presence of the non-pyrrolidinone nitrogen-containing compound in the hydrocarbon fluid using the gas chromatography report;
  c) spectroscopically analyzing a second sample of the hydrocarbon fluid, thereby resulting in a spectroscopic report of the second sample; and
  d) identifying the presence of the spectroscopic marker in the hydrocarbon fluid using the spectroscopic report.

2. The method of claim 1, wherein the gas chromatography system is a gas chromatography with nitrogen phosphorus detector (GC-NPD) system and step a) is introducing the sample into the GC-NPD system.

3. The method of claim 2, wherein the GC-NPD system includes a flame thermionic detector or an alkali flame-ionization detector.

4. The method of claim 2, wherein the gas chromatography report resulting from step a) includes an intensity value that is proportional to an amount of nitrogen or phosphorus in the sample.

5. The method of claim 4, wherein the intensity is time-variable as a function of elution times of components of the sample.

6. The method of claim 5, wherein the identifying of step b) includes monitoring the intensity value at one or more predetermined elution times.

7. The method of claim 1, wherein the gas chromatography system is a gas chromatography-mass spectrometry (GC-MS) system, a gas chromatography-Hall electrolytic conductivity detector (GC-HECD) system, a gas chromatography-flame ionization detector (GC-FID) system, a gas chromatography-electron capture detector (GC-ECD) system, a gas chromatography-photoionization detector (GC-PID) system, or a combination thereof, and step a) is introducing the sample into the GC-MS system, the GC-HECD system, the GC-FID system, the GC-ECD system, the GC-PID system, or the combination thereof.

8. The method of claim 1, wherein the gas chromatography system includes a fused silica column, a polyethylene glycol column, a cyano propyl column, a trifluorpropyl column, a substituted polysiloxane column, or a combination thereof and the introducing of step a) includes introducing the sample into the fused silica column, the polyethylene glycol column, the cyano propyl column, the trifluorpropyl column, the substituted polysiloxane column, or the combination thereof.

9. The method of claim 1, wherein the introducing of step a) includes introducing the sample with a carrier gas selected from the group consisting of nitrogen, helium, and combinations thereof.

10. The method of claim 1, wherein the identifying of step b) includes comparing the gas chromatography report to a reference report.

11. The method of claim 1, wherein the non-pyrrolidinone nitrogen-containing compound is present in the hydrocarbon fluid in an amount of between 0.1 ppm and 500 ppm.

12. The method of claim 1, wherein the spectroscopically analyzing of step c) includes conducting fluorescence spectroscopy, UV-Vis spectroscopy, Raman spectroscopy, near infrared spectroscopy, or a combination thereof.

13. The method of claim 1, wherein the identifying of step d) includes comparing the spectroscopic report to a reference spectrum.

14. The method of claim 1, wherein the spectroscopic marker is present in the hydrocarbon fluid in an amount of between 0.1 ppm and 500 ppm.

15. A method of marking a subset of hydrocarbon fluids in circulation within a market and detecting the presence of the marking, the method comprising:
   a) adding a gas chromatography marker comprising a non-pyrrolidinone nitrogen-containing compound to the subset of the hydrocarbon fluids in circulation within the market, wherein the non-pyrrolidinone nitrogen-containing compound is a core structure with zero, one, two, or three alkyl or alkenyl side chains of 1 to 12 carbon atoms in length, wherein the core structure is pyrrole, pyrazole, pyrazolone, pyridine, pyridazine, pyrimidine, pyrrole, pyrrolidine, piperidone, piperidine, piperazine, pyrazine, pyridazinone, imidazole, imidazolidone, oxazole, oxazoline, or oxazolidine;
   b) selecting a sample of one of the hydrocarbon fluids in circulation within the market;
   c) introducing at least a portion of the sample of one of the hydrocarbon fluids in circulation within the market into a gas chromatography system, thereby resulting in a gas chromatography report of the sample;
   d) identifying the presence or absence of the non-pyrrolidinone nitrogen-containing compound in the sample using the gas chromatography report, thereby identifying whether the sample is from within or without the subset of hydrocarbon fluids;
   e) adding a spectroscopic marker to the subset of the hydrocarbon fluids in circulation within the market, wherein the non-pyrrolidinone nitrogen-containing compound and the spectroscopic marker are different chemical entities;
   f) spectroscopically analyzing at least a second portion of the sample of one of the hydrocarbon fluids in circulation within the market, thereby resulting in a spectroscopic report of the sample; and
   g) identifying the presence or absence of the spectroscopic marker in the sample using the spectroscopic report, thereby identifying whether the sample is from within or without the subset of hydrocarbon fluids.

16. The method of claim 15, wherein the gas chromatography system is a gas chromatography with nitrogen phosphorus detector (GC-NPD) system and step c) is introducing the sample into the GC-NPD system.

17. The method of claim 16, wherein the GC-NPD system includes a flame thermionic detector or an alkali flame-ionization detector.

18. A method of identifying marked hydrocarbon fluids that have been laundered, wherein unlaundered marked hydrocarbon fluids contain a gas chromatography marker and a spectroscopic marker, the gas chromatography marker including a non-pyrrolidinone nitrogen-containing compound, wherein the non-pyrrolidinone nitrogen-containing compound is a core structure with zero, one, two, or three alkyl or alkenyl side chains of 1 to 12 carbon atoms in length, wherein the core structure is pyrrole, pyrazole, pyrazolone, pyridine, pyridazine, pyrimidine, pyrrole, pyrrolidine, piperidone, piperidine, piperazine, pyrazine, pyridazinone, imidazole, imidazolidone, oxazole, oxazoline, or oxazolidine, the non-pyrrolidinone nitrogen-containing compound and the spectroscopic marker are different chemical entities, the method comprising:
   a) introducing a first portion of a hydrocarbon fluid sample that is suspecting of having been laundered into a gas chromatography system, thereby resulting in a gas chromatography report of the hydrocarbon fluid sample;
   b) spectroscopically analyzing a second portion of the hydrocarbon fluid sample, thereby resulting in a spectroscopic report of the hydrocarbon fluid sample;
   c) identifying the presence or absence of the gas chromatography marker using the gas chromatography report and identifying the presence or absence of the spectroscopic marker using the spectroscopic report; and
   d) based on the identifying of step c):
   if the gas chromatography marker and the spectroscopic marker are identified as present, then indicating that the hydrocarbon fluid sample is marked and unlaundered;
   if the gas chromatography marker is identified as present and the spectroscopic marker is identified as absent, then indicating that the hydrocarbon fluid sample is marked and laundered; and
   if the gas chromatography marker and the spectroscopic marker are identified as absent, then indicating the hydrocarbon fluid is unmarked.

* * * * *